(12) United States Patent
Adarve Lozano

(10) Patent No.: US 7,878,455 B2
(45) Date of Patent: Feb. 1, 2011

(54) REFUELING BOOM WITH BACKUP RAISING CABLE

(75) Inventor: Alberto Adarve Lozano, Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 510 days.

(21) Appl. No.: 12/009,824

(22) Filed: Jan. 22, 2008

(65) Prior Publication Data
US 2009/0127394 A1 May 21, 2009

(30) Foreign Application Priority Data
Nov. 19, 2007 (ES) .............. PCT/ES2007/070190

(51) Int. Cl.
*B64D 39/00* (2006.01)
(52) U.S. Cl. ................................... 244/135 A
(58) Field of Classification Search ............. 244/1 TD, 244/110 G, 129.6, 135 A
See application file for complete search history.

(56) References Cited

U.S. PATENT DOCUMENTS

| | | | | |
|---|---|---|---|---|
| 2,663,523 A | * | 12/1953 | Leisy ..................... 244/135 A |
| 2,716,527 A | * | 8/1955 | Latimer-Needham .......... 244/3 |
| 2,949,265 A | * | 8/1960 | Person .................... 244/135 A |
| 4,129,270 A | * | 12/1978 | Robinson et al. ........ 244/135 A |
| 4,792,107 A | * | 12/1988 | Fernz et al. ................. 244/115 |
| 6,779,758 B2 | * | 8/2004 | Vu et al. .................. 244/135 A |

FOREIGN PATENT DOCUMENTS

RU 2142897 C1 * 12/1999

* cited by examiner

*Primary Examiner*—Tien Dinh
*Assistant Examiner*—Michael Kreiner
(74) *Attorney, Agent, or Firm*—Ladas & Parry LLP

(57) ABSTRACT

A backup device for raising a refueling boom interconnecting a tanker aircraft with a receiver aircraft in flight, the boom being joined to the tanker aircraft by a mechanical articulation and a hoist cable. The backup device includes a secondary cable fixed at one side in the boom, and fixed at the other side in a cable actuator placed inside the tanker aircraft, the secondary cable being extended along the underside of the tanker aircraft and along the boom, and attached to them in at least three intermediate points with clips or staples that can be released by a force exerted through the secondary cable. The cable actuator has rolling devices to roll the secondary cable for raising the boom to the stowed position.

4 Claims, 1 Drawing Sheet

REFUELING BOOM WITH BACKUP RAISING CABLE

TECHNICAL FIELD

The present invention relates generally to aircraft refueling booms and more specifically to an aircraft refueling boom system having backup raising cable.

BACKGROUND

For in flight refueling operations, one usual method is based on the use of a boom device for interconnecting a tanker aircraft with a receiver aircraft in flight, which is basically a telescopic tube which is attached to the underside of the tanker aircraft by means of an articulation element. The boom moves around this fixed point during the refueling operation using a pair of aerodynamic lift surfaces known as ruddevators.

The boom is also attached to the tanker aircraft by means of a hoist cable to raise the boom to its stowed position to permit landing and other non refueling operations. When the boom is in operation this cable is dynamically coiled to suitable means to always follow the distance between the boom and the aircraft to maintain tension without interfering with the boom movements. Should this cable breaks, this will conduct to a problematic landing operation with the possible destruction of the boom and possibly other collateral effects.

The present invention is intended to solve the broken cable problem.

SUMMARY OF THE INVENTION

The present invention provides a backup device for raising a refueling boom interconnecting a tanker aircraft with a receiver aircraft in flight which is joined to the tanker aircraft by means of a mechanical articulation and a hoist cable comprising a secondary cable and a cable actuator placed inside the tanker aircraft.

The secondary cable is fixed at one side in the boom and at the other side in a cable actuator placed and extended along the underside of the tanker aircraft and the boom and attached to them in at least three intermediate points by attaching means that can be released by a force exerted through the cable.

The cable actuator has rolling means to roll the cable for raising the boom to the stowed position. When not in use, this secondary cable does not interfere in the normal refueling operation and it remains fixed to the tanker.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE INVENTION

Figure 1:
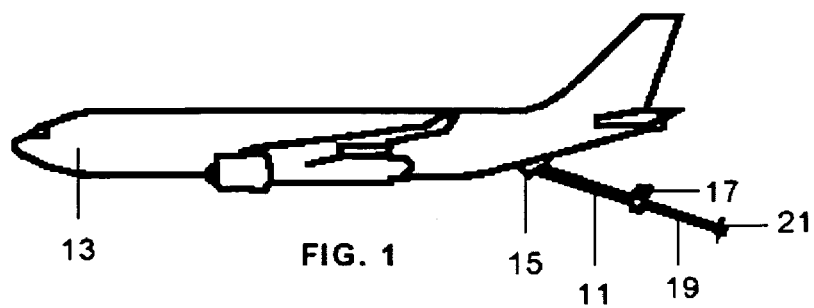
FIG. 1 shows a tanker aircraft with an extended boom.
Figure 2:
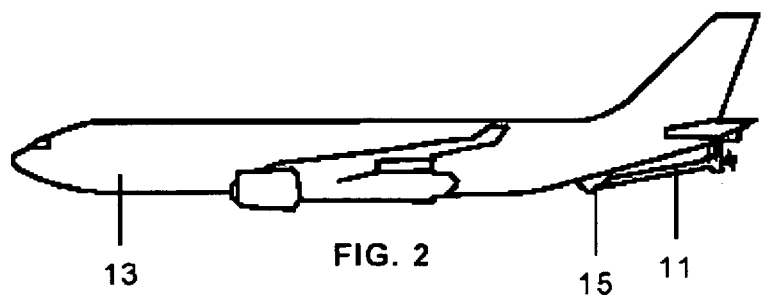
FIG. 2 shows a tanker aircraft with the boom in the stowed position.
Figure 3:
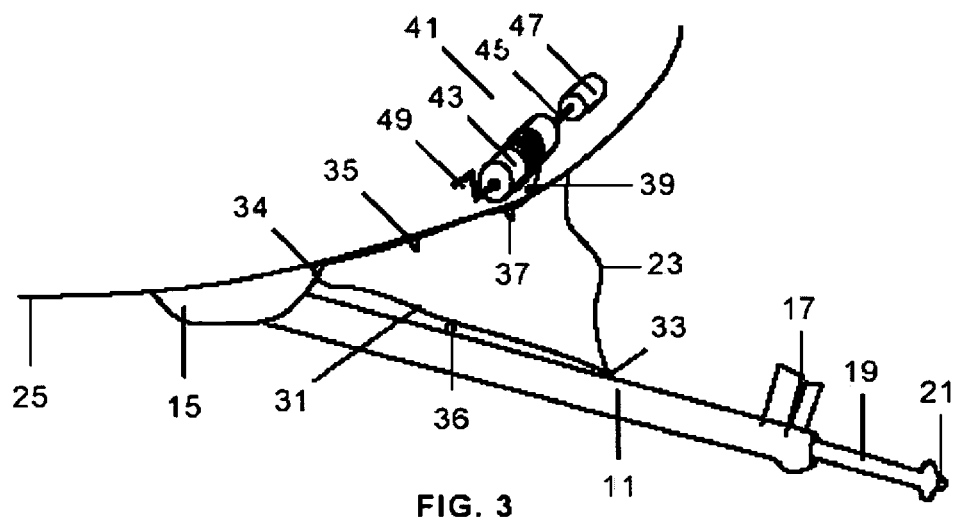
FIG. 3 shows schematically the backup device according to this invention.

An aircraft refueling boom 11 is a telescoping beam fueltight unit with its forward end attached to the underside 25 of a tanker aircraft 13 by means of a mechanical articulation 15. Integrally attached to the boom 11 are ruddevators 17 which are used to aerodynamically control the position of the boom 11 in elevation and azimuth.

The outer end portion 19 of the boom 11 is a telescoping section for inward and outward movement. Located on the distal end of the telescoping tube 19 is a nozzle 21. The receiver aircraft, not shown, is equipped with an aerial refueling receptacle which engages with the nozzle 21 for the refueling operation.

The boom 11 is attached to the tanker aircraft by means of a hoist cable 23 that must follow the movements of the boom 11 to avoid any disturbance to its flying properties.

The secondary cable 31 is fixed in one side to the boom 11 in a point 33, preferably located in its central part and in the other side to the cable actuator 41 and it is extended, passing through a pulley 39, along the underside 25 of the tanker aircraft 13, and along the boom 11 in a path that allows any boom movement without changing its length. The secondary cable 31 is attached to the underside 25 of the tanker aircraft 13 and to the boom by clips or staples 34, 35, 36, 37 strong enough to maintain it at its normal non functioning hidden position and weak enough to be torn off when this secondary cable 31 is needed for raising the boom 11.

The cable actuator 41 includes a reel 43 mounted in a shaft 45 which is connected to an electric motor 47 for an automatic operation of the reel 43 and, optionally, to a manual crank for a manual operation of the reel 43 to have the possibility to actuate it even in the case that the electric motor 47 fails.

If, when trying to retract the boom 11, the hoist cable 23 fails or breaks, the backup device according to this invention is used pulling the secondary cable 31, operating the reel 11 with the electrical motor 47 or with the crank 49 to roll the secondary cable in it for, firstly, breaking the clips or staples 34, 35, 36, 37 that fix it to the underside 25 of the tanker aircraft 13 and the boom 11 and, secondly, for tensioning the secondary cable to raise the boom to the stowed position.

Figure 4:
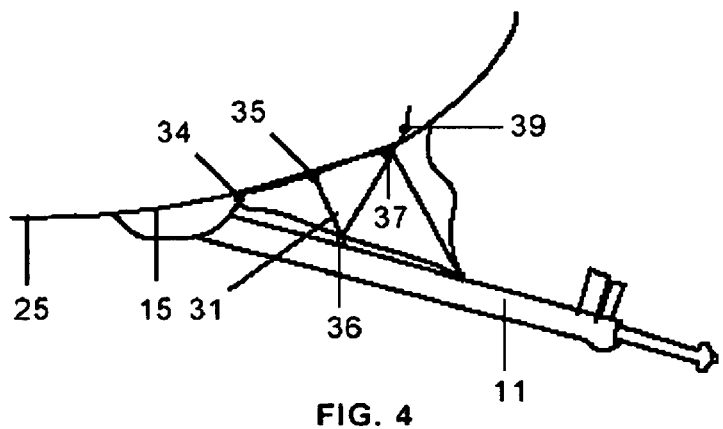
FIG. 4 shows schematically the boom raising operation using the backup device according to this invention.

As shown in FIG. 4, the staple 34 will be the most probably to break first and then staples 35, 36, 37 will follow until the secondary cable 31 will be tight enough to begin the raising operation.

To be extended along the along the underside 25 of the tanker aircraft 13 and the boom 11 in the manner described, the secondary cable 31 shall be able to have curved parts, so that shall be made of a flexible, resistant non metallic fiber. In a preferred embodiment the secondary cable is made of KEVLAR brand synthetic fiber.

The minimum number of attachment points of the secondary cable 31 shall be 3, preferable one point at the underside 25 of the tanker aircraft 13, one point at the mechanical articulation 15, and one point at the boom 11.

The probability to break the hoist cable 23 cable has evolved to numbers that predicts a few breaks during the aircraft life. In those unpredictable cases the device according to this invention will perform the same function providing a high degree of security at flight test time and in normal operation.

Although the present invention has been fully described in connection with preferred embodiments, it is evident that modifications may be introduced within the scope thereof, not considering this as limited by these embodiments, but by the contents of the following claims.

The invention claimed is:

1. A backup device for raising a refueling boom interconnecting a tanker aircraft with a receiver aircraft in flight, said boom being joined to said tanker aircraft by means of a mechanical articulation and a hoist cable, wherein the backup device comprises a secondary cable fixed at one side in the boom, and fixed at the other side in a cable actuator placed inside the tanker aircraft, said secondary cable being extended along the underside of the tanker aircraft and along the boom, and attached to them in at least three intermediate points with means that can be released by a force exerted through the secondary cable, said cable actuator having rolling means to roll the secondary cable for raising the boom to the stowed position.

2. The backup device for raising a refueling boom according to claim 1, wherein said secondary cable is made of a non metallic fiber.

3. The backup device for raising a refueling boom according to claim 2, wherein the secondary cable is made of synthetic fiber.

4. The backup device for raising a refueling boom according to claim 1, wherein said secondary cable is attached in at least one point to the underside of the tanker aircraft, the mechanical articulation, and the boom.

* * * * *